(12) United States Patent
Gerety et al.

(10) Patent No.: US 6,560,741 B1
(45) Date of Patent: May 6, 2003

(54) TWO-DIMENSIONAL PRINTED CODE FOR STORING BIOMETRIC INFORMATION AND INTEGRATED OFF-LINE APPARATUS FOR READING SAME

(75) Inventors: Eugene P. Gerety, Seymour, CT (US); Richard A. Strempski, Danbury, CT (US); Stephen G. Sardi, Bethany, CT (US)

(73) Assignee: Datastrip (IOM) Limited, Isle of Man ( * ) Notice: Subject to any disclaimer, the term of this patent is extended or adjusted under 35 U.S.C. 154(b) by 0 days.

(21) Appl. No.: 09/256,754

(22) Filed: Feb. 24, 1999

(51) Int. Cl.⁷ .................. H03M 13/00; H03M 13/03; G06K 7/10
(52) U.S. Cl. ............... 714/752; 714/755; 714/784; 714/786; 235/437; 235/456; 235/462.07
(58) Field of Search .................. 714/752, 755, 714/784, 786; 235/437, 462.08, 462.12, 380, 382, 487, 492, 462.07, 456; 340/583

(56) References Cited

U.S. PATENT DOCUMENTS

| | | | |
|---|---|---|---|
| 4,782,221 A | 11/1988 | Brass et al. | 235/494 |
| 4,910,725 A | 3/1990 | Drexler et al. | 369/275.1 |
| 5,180,901 A | 1/1993 | Hiramatsu | 235/380 |
| 5,304,786 A | 4/1994 | Pavlidis et al. | 235/462.07 |
| 5,761,219 A | 6/1998 | Maltsev | 714/752 |
| 5,778,011 A * | 7/1998 | Blaum et al. | 714/755 |
| 6,186,485 B1 * | 2/2001 | Yoshioka | 235/494 |

FOREIGN PATENT DOCUMENTS

| | | |
|---|---|---|
| DE | 19648767 | 6/1997 |
| EP | 0110367 | 6/1984 |

OTHER PUBLICATIONS

Javidi, B. and Ahouzi, E. "Optical Security System with Fourier Plane Encoding" Applied Optics vol. 37, No. 26, Sep. 10, 1998, pp. 6247–6255.

*Uniform Symbology Specification PDF417*; Jul. 1994; AI USA; Pittsburgh, Pennsylvania.

* cited by examiner

Primary Examiner—Emmanuel L. Moise
(74) Attorney, Agent, or Firm—Kalow & Springut LLP

(57) ABSTRACT

A two-dimensional, high-density, damage-tolerant printed code suitable for encoding multiple biometrics and text for positive off-line identity verification comprises a horizontal header section; a vertical header section; a start pattern; a left row address pattern; an encoded data portion; a right two address pattern; and stop pattern. The horizontal header section encodes the number of bit areas in a transverse row of the encoded data portion; and the vertical header section encodes the vertical height of each bit area. The start and stop patterns of the code demarcate the lateral extent of the code (i.e., the beginning and end) from the adjacent quiet zone. Information is encoded into the ended information portion in bit areas that may be printed or blank. The information is encoded sequentially in the information portion from the top of the encoded information portion along each transverse row of bit areas to the next row of bit areas until the end of the encoded information portion. Error correction is applied to subunits of information from the encoded information portion by dividing the user messages and applying error correction to subunits of the user message. The two-dimensional, high-density, damage-tolerant printed code is suitable for printed on a conventionally sized ISO cord or other papers used in verifying identity. An ISO-sized cord or other identity paper bearing a two-dimensional, high-density, damage-tolerant printed code encoding multiple biometrics, e.g., encoded image likeness and multiple finger print templates, maybe used with an off-line integrated positive identity verification apparatus that is capable of decoding the image and fingerprint samples taken from an individual whose identity is sought to be verified.

9 Claims, 15 Drawing Sheets

TWO-DIMENSIONAL PRINTED CODE FOR STORING BIOMETRIC INFORMATION AND INTEGRATED OFF-LINE APPARATUS FOR READING SAME

FIELD OF THE INVENTION

This invention relates to high-density printed codes and, in particular, to high-density printed codes that have improved damage-tolerance. In addition, the invention concerns high-density printed codes capable of storing multiple biometrics and text for positive identity identification. Further, the invention concerns off-line positive identity identification apparatus capable of operating in combination with high-density printed codes storing multiple biometrics.

BACKGROUND OF THE INVENTION

Numerous technologies have been developed over the past two decades that are capable of storing significant amounts data (on the order of a kilobyte or more) in a small, compact space (a few square inches or less). Such technologies include so-called "smart cards"; CD-ROM-based optical storage media; magnetic stripe cards; and two-dimensional high-capacity printed bar codes and matrix codes. Depending on the overall information capacity of the medium, each of these technologies may be suitable for storing biometric information for use in positive identity verification applications. Each of these technologies has its advantages and disadvantages in this specific application and other applications.

One of the primary advantages of two-dimensional high-capacity printed bar codes and matrix codes results from the fact that they can be created using conventional printing techniques (including laser printers). One application among many for these codes is in positive identity verification programs where such codes are used to identify human beings. Due to the often enormous number of identification documents that may be created in positive identity verification programs, the fact that two-dimensional printed codes can be formed by conventional printing techniques provides a significant cost advantage over "smart cards," CD-ROM-based optical storage media; and magnetic stripe cards. Further, error-corrected two-dimensional printed codes are far more robust than smart cards with respect to the ability to tolerate electromagnetic fields, radiation and mechanical stress and CD-ROM-based optical storage media with respect to the ability to withstand scuffing and scratching. "Smart cards" incorporate circuitry and chips that may be damaged should the card be flexed, limiting the suitability of the card for low-cost applications.

Within the art of printed codes, over the past decade, numerous two-dimensional printed paper-based codes have been introduced. These codes represent a substantial improvement over prior one-dimensional bar codes in a number of areas. Most importantly, these codes are capable of storing hundreds of bytes of information, approaching a kilobyte, in a few square inches. In contrast, prior one-dimensional bar codes were capable of storing only a few characters, on the order of ten or twelve, in roughly the same space.

Such codes also exhibit improved error detection and correction capability. For example, one such code, PDF417, disclosed in U.S. Pat. No. 5,304,786, employs the Reed-Solomon error correcting method to improve the damage-tolerance of the code.

Using the Reed-Solomon error correcting method, additional codewords are appended to the end of the data codewords appearing in the PDF417 symbol. If a substantial contiguous portion of the code were to be destroyed or otherwise rendered unreadable (a likely possibility due to the often rugged conditions these codes encounter, e.g., on the outside of a shipping parcel, or on a part on an assembly line), the data represented in the data codewords can still be recovered by reading the Reed-Solomon error correction codewords included in the symbol.

One drawback of PDF417 is the fact that it employs an (n, k) bar code encoding methodology based on 929 codewords. As a result, each PDF417 codeword has a data capacity of 9.25 bits. Given the length of the codeword (17 bits), this results in a substantial overhead (redundant portion of the code). In addition, PDF417 is capable of storing only about 1500 bytes of information with minimal levels of error correction, and much less in the case with acceptable levels of error correction.

Another code is the data strip code disclosed and claimed in U.S. Pat. No. 4,782,221. The data strip code disclosed and claimed in U.S. Pat. No. 4,782,221 is capable of storing up to a kilobyte or more of information in a small space but is vulnerable to data loss in the case of large area destruction due to the relatively limited error correction capability of the code.

Other two-dimensional printed codes include matrix codes, e.g., Datamatrix, or the UPS Maxicode, which have been used in small parts identification and package sortation. These codes have features that facilitate discrimination of the code from a background that is particularly useful when the code is being scanned by a reading device placed above a conveyer belt on which the part or parcel is moving. These codes, while particularly useful in such applications, have not been found to be suitable where large amounts of information are sought to be encoded in a relatively small amount of space.

Overcoming the limitations of these prior printed codes is particularly important because a major application for such codes is off-line positive identity verification. In such applications, biometrics that provide a positive identity verification capability are encoded in the two-dimensional code. Such codes, when operating with apparatus capable of decoding the code, permit positive identity verification to occur independent of a central database storing such identity verification information. This lends a great deal of flexibility in instances where temporary installations are used by governments, e.g., in voting; voting might occur in an installation not having a fixed identity verification apparatus or connection to a central identity database. Having a printed code encoding identity information permits positive identity verification to occur without a permanent positive identity verification apparatus in place.

In order to function effectively in such off-line positive identity verification applications, two-dimensional printed codes must be capable of storing biometric information used in positive identity verification. In addition, the codes storing biometric information must be tailored to fit on standard-sized identity verification papers like, e.g., conventionally-sized ISO cards or passports. These standards are set forth in the International Civil Aviation Organization document entitled Machine Readable Travel Documents 9303 Parts 1–4. Document 9303 Parts 1–4 identifies a number of standard-sized travel documents including machine readable official travel document 1 (MROTD1) card (the ubiquitous ISO CR-80 credit-card sized card which is 2.125×3.375 inches and in the MRTOD1 application allocates 0.98×3.13 inches to a two-dimensional printed code); the oversized identification card (designated MROTD2 and which allocates 0.72×2.52 inches for a two-dimensional printed code); and a conventional passport page (which allocates 0.72×3.14 inches for a two-dimensional printed code.

These standards illustrate that even with the advent of machine-readable codes, standards organizations are still unwilling to dedicate all or most of a document to a machine-readable code and instead specify standards that leave large areas in which to print human-readable information. As a result, real estate on such documents is precious and most be used efficiently, indicating the desirability of even higher density two-dimensional printed codes.

Due to the requirements of known compression techniques for compressing files storing biometric information, known two-dimensional codes have relatively limited capability for providing highly-accurate positive identity verification where such identification is dependent on storing multiple biometrics. For example, known data compression techniques create files that are on the order of 500–750 bytes per fingerprint template (uncompressed) and 900–1100 bytes (compressed) for a photographic image of a person. Thus, a government agency or private company interested in establishing a positive identity verification program based on encoding three fingerprint templates; a photograph; and text would be seeking to store on the order of 2800 bytes of information in a known two-dimensional code. There are no known two-dimensional printed codes capable of storing that much information in a single code symbol with a level of error correction that would provide robust, damage-tolerant performance.

As a result, such an application would require on-line capability, i.e., some biometric information would have to be stored in a central database in order to achieve highly accurate positive identification. This would limit the flexibility of the system, because personnel interested in positively identifying individuals would require a dedicated connection to the database for as long as they were performing identity verification.

In addition, known off-line verification apparatus capable of operating with desired two-dimensional, high-density damage-tolerant printed codes are relatively bulky and depend on separate units for performing various operations necessary to positively verify identity, e.g., fingerprint scanning; fingerprint minutiae extraction; comparison of fingerprint minutiae with fingerprint record stored in printed code; and comparison of photographic images with stored images. These operations may require multiple, stand-alone units, thereby limiting the flexibility of the system, and they may effectively mandate fixed identity verification stations even in off-line positive identity verification applications.

Thus, it is desired to have a two-dimensional printed code having improved information capacity.

It is also desired to have a two-dimensional printed code having improved damage tolerance.

It is further desired to have a two-dimensional, high-density, damage-tolerant printed code capable of storing multiple, high-quality biometrics.

It is also desired to have a conventionally-sized ISO card or other conventional identification paper bearing a two-dimensional, high-density, damage-tolerant printed code storing multiple, high-quality biometrics.

It is further desired to have a conventionally-sized ISO card or other conventional identification papers bearing a two-dimensional, high-density, damage-tolerant printed code storing multiple, high-quality biometrics that may be used in off line positive identity verification applications.

It is also desired to have a fully-integrated, compact off-line positive identity verification apparatus capable of operating with conventionally-sized identity verification papers bearing two-dimensional printed codes encoding multiple, high-quality biometrics.

SUMMARY OF THE INVENTION

Accordingly, it is an object of the present invention to provide a two-dimensional printed code having improved information capacity.

It is another object of the present invention to provide a two-dimensional printed code having improved damage tolerance.

It is a further object of the present invention to provide a two-dimensional, high-density, damage-tolerant printed code capable of storing multiple, high-quality biometrics.

It is yet another object of the present invention to provide conventionally-sized ISO card or other identity verification papers capable of bearing a two-dimensional, high-density damage tolerant printed code encoding multiple, high-quality biometrics for use in off-line, positive identity verification applications.

It is a yet further object of the present invention to provide a fully-integrated, compact, hand-held, off-line positive identity verification apparatus capable of providing identity verification with a high degree of accuracy by recovering biometric information encoded in a two-dimensional, high-density, damage-tolerant printed code.

The foregoing objects are accomplished by the present invention of a two-dimensional, high-density, damage tolerant printed code suitable for encoding multiple biometrics and text for positive off-line identity verification. In a preferred embodiment, such a code comprises a horizontal header section; a vertical header section; a start pattern; a left row address pattern; an encoded user data portion; a right row address pattern; and a stop pattern. The horizontal header section encodes the number of bit areas in a transverse row of the encoded information portion; and the vertical header section encodes the vertical height of each bit area. The start and stop patterns of the code demarcate the lateral extent of the code (i.e., the beginning and end) from the adjacent quiet zone. Information is encoded into the encoded information portion in bit areas that may be printed or blank. The encoded user data is printed sequentially in the encoded user data portion from the top of the encoded information along each transverse row of bit areas to the next row of bit areas until the end of the encoded information portion.

In the preferred embodiment, prior to encoding, the user information to be encoded in the information portion is divided into a number of packets that represent sequential subunits of information. A subunit of each packet (e.g., a byte comprising the most significant bits of each packet) is selected and then combined into an error correction packet for error correction purposes. A conventional error correction algorithm is then applied to this first error correction packet for error correction purposes. A number of error correction bits are then created, and these are appended to the end of the user information portion. The process is then repeated by selecting the next most significant bits from each packet and combining them into an error correction packet for error correction purposes. The error correction algorithm is then applied to this second error correction packet to create a number of error correction bits. These error correction bits are then appended to the user information and first collection of error correction bits. The process is repeated until all the information in each packet has been error corrected. The information is then formatted into a file that, when printed, will constitute a two-dimensional, high-density, damage-tolerant, printed code.

In another embodiment of the present invention the user information to be encoded in the two-dimensional printed code is arrayed in computer memory in the row-column sequence in which it is to be printed in the two-dimensional, high-density, damage-tolerant printed code. The row-column organized information is then divided into a number of two-dimensional packets of (n, m) dimension that represent contiguous bits to be printed in the two-dimensional printed code. A subunit of bits is selected from each of said two-dimensional packets of (n, m) dimension and combined into a first error correction packet for error correction purposes. An error correction algorithm is then applied to the first error correction packet. The error bits thus created in this first step are next formed into a two-dimensional collection of bits to be printed contiguously after the user data. The process is continued until error correction information is created for all user information.

In a further embodiment of the present invention, the control data indicating the length of the file encoded in the two-dimensional printed code and the level and manner of error correction are separately error corrected to create a number of error correction bits for use in case of catastrophic damage to that portion of the code encoding the control data. In fixed length and fixed error correction format codes, this information is interspersed at known locations throughout the code to provide robust damage tolerance. In variable length and error correction codes, the header can store the location of the control data error correction bits by encoding a number corresponding to one from a number of options. This indicates where the reader should look for the error correction bits corresponding to the control data in the case of catastrophic damage to the control data portion of the code.

Two-dimensional, high-density, damage-tolerant printed codes made in accordance with the foregoing embodiments are capable of encoding 2800 bytes of information (sufficient for multiple biometrics (fingerpints and image) and text) with a robust level of error correction resulting in an overall message length of 3400 bytes. The information would be printed in a code having an encoded user data portion of 0.84 inches by 2.87 inches (the minimum feature having a size of 0.0066×0.010 inches). Such a printed code would easily fit on a portion of one side of a conventional 2.125×3.375 inch card, leaving substantial space for human readable information on the remaining portion of the card.

In yet another embodiment of the present invention, a two-dimensional, high-density, damage tolerant printed code encoding multiple biometric information and text is imprinted on conventionally-sized ISO cards or other identification documents (e.g., passports) for use in off-line positive identity verification applications.

A yet further embodiment of the present invention comprises a fully-integrated, compact, hand-held (the apparatus can also be counter-mounted or wall-mounted), off-line positive identity verification apparatus having scanning means which may include a scanned one-dimensional charge-coupled device (1D CCD); a CMOS contact image sensor or other 1D sensors; or a two-dimensional charge-coupled device (2D CCD) for recovering biometric information stored in a two-dimensional, high-density, damage tolerant printed codes; real-time biometric capture capabilities (e.g., for capturing fingerprints); a microprocessor and associated programming for comparing real time biometric information captured from an individual whose identity is sought to be verified with biometric information recovered from a two-dimensional printed code; and indication apparatus to indicate whether as a result of the biometric comparison process the individual has been identified as authentic or an impostor.

A yet further embodiment of the present invention comprises the combination of a two-dimensional, high-density, damage-tolerant printed code and a fully-integrated, compact, hand-held (the apparatus can also be counter-mounted or wall-mounted) off-line positive identity verification apparatus. The fully-integrated, compact, hand-held off-line positive identity verification apparatus has a scanner for recovering biometric information from a two-dimensional, high-density, damage-tolerant printed code, and real-time biometric capture capability for capturing biometric information from the person whose identity is sought to be verified. The positive identity verification apparatus then compares the biometric information to determine whether the individual is authentic or an impostor.

From the foregoing description, a number of advantages of the present invention become apparent. First, the invention provides a two-dimensional, damage-tolerant, printed code with both improved total information capacity and improved high information density performance. This is accomplished through a code format that provides both a high information capacity and a robust level of error correction in a small space. Second, the invention provides a two-dimensional, high-density, damage-tolerant printed code capable of storing multiple biometrics that makes possible a highly-accurate off-line positive identity verification by comparing biometrics captured in real-time from an individual whose identity is sought to be verified with biometrics recovered from the printed code. Third, the invention provides a fully-integrated, compact, hand-held off-line positive identity verification apparatus that greatly increases the flexibility of positive identity verification operations by making both the identity verification information (stored in a small card) and identity verification apparatus (fully-integrated and hand-held) highly mobile. No longer are governments or private businesses interested in establishing positive identity verification programs relegated to storing such information in a central data base generally accessible only from fixed-site, dedicated positive identity verification installations.

BRIEF DESCRIPTION OF THE DRAWINGS

The above and other objects of this invention will be apparent upon consideration of the following detailed description, taken in conjunction with the accompanying drawings in which like characters refer to like parts throughout and in which.

DETAILED OF THE PREFERRED EMBODIMENTS

A. Background

The invention concerns in part a two-dimensional printed bar code or matrix code wherein the same user message can be printed in codes that vary in density. The fundamental unit for encoding information is called a "bit area," which may be printed or blank. Information may be encoded using various encoding methodologies well-known in the art including (n, k) bar codes; dibit codes; other run-length-limited codes; and direct binary encoding.

The two-dimensional, high-density, damage tolerant printed code of the invention is an improvement over the data strip printed code disclosed in U.S. Pat. No. 4,782,221, and made reference to in U.S. Pat. No. 4,692,603. These two patents are hereby incorporated by reference in their entirety.

Figure 1A:
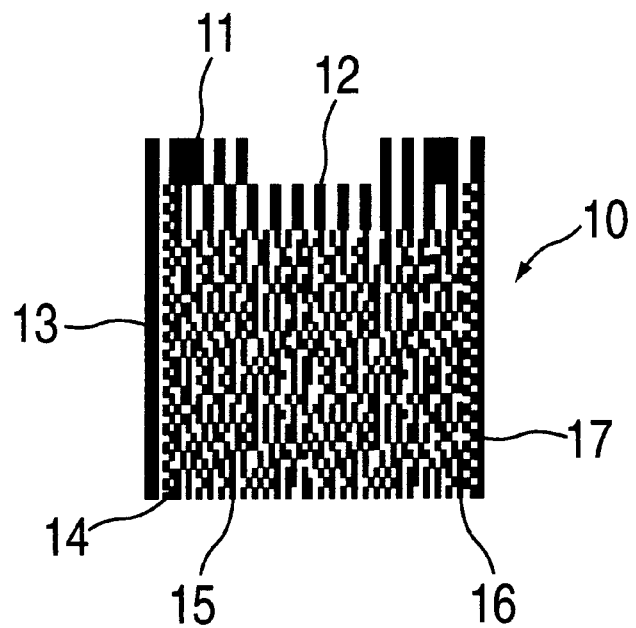
FIG. 1A is a plan view of the prior art data strip code.
Figure 1B:
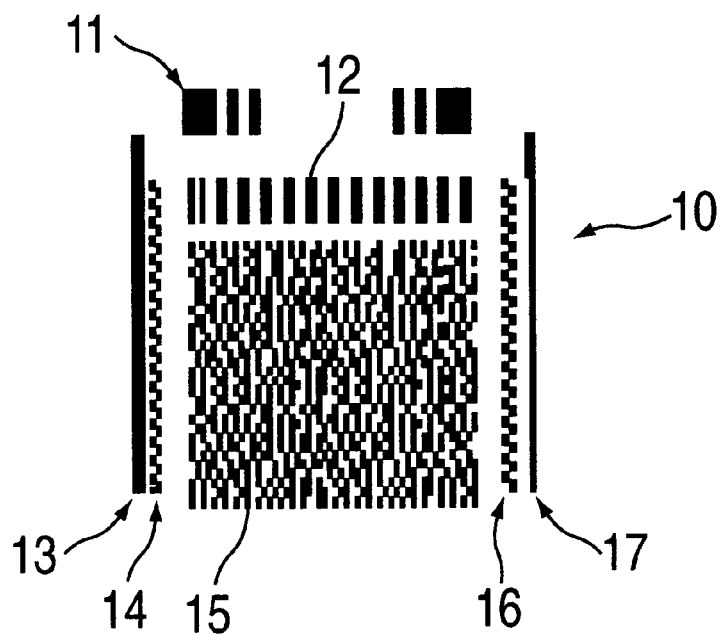
FIG. 1B is an exploded view of the prior art data strip code.

The structure of the prior data strip 10 is depicted in FIGS. 1A–B, and comprises a horizontal header section; a vertical header section 12; a left giude bar 13; a rack 14; an encoded data portion 15; a checkerboard 16; and a right guide bar 17.

The two-dimensional, high-density, damage tolerant printed code of the invention incorporates a number of improvements over the data strip disclosed in U.S. Pat. No. 4,782,221. First, information in a preferred embodiment is encoded in the code using a direct binary encoding method wherein a bit area in the printed code may represent a bit of user data. This achieves a significant improvement in information density over the dibit encoding methodology used in U.S. Pat. No. 4,782,221. Variants within the scope of the present invention would include direct binary encoding methodologies that use data compression prior to encoding of error correction information, or the insertion of start/stop bits to provide clocking information.

B. Preferred Embodiments of the Printed Code

Figure 2A:
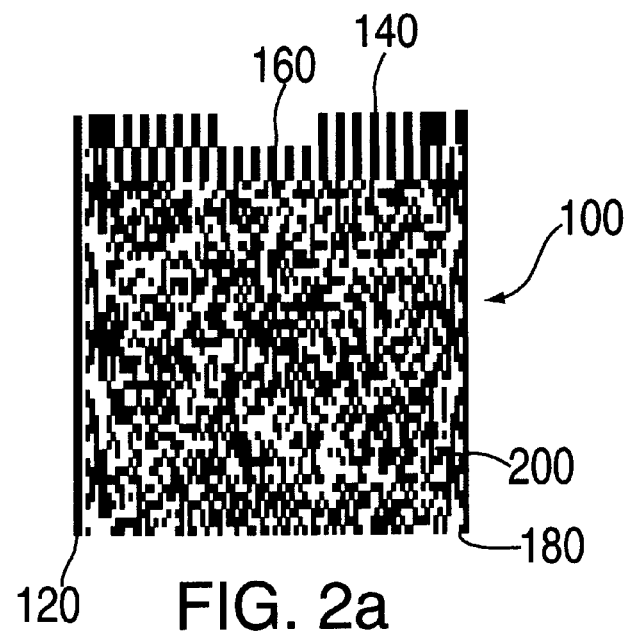
FIG. 2A is a plan view of the two-dimensional, high-density, damage-tolerant printed code of the present invention.
Figure 2B:
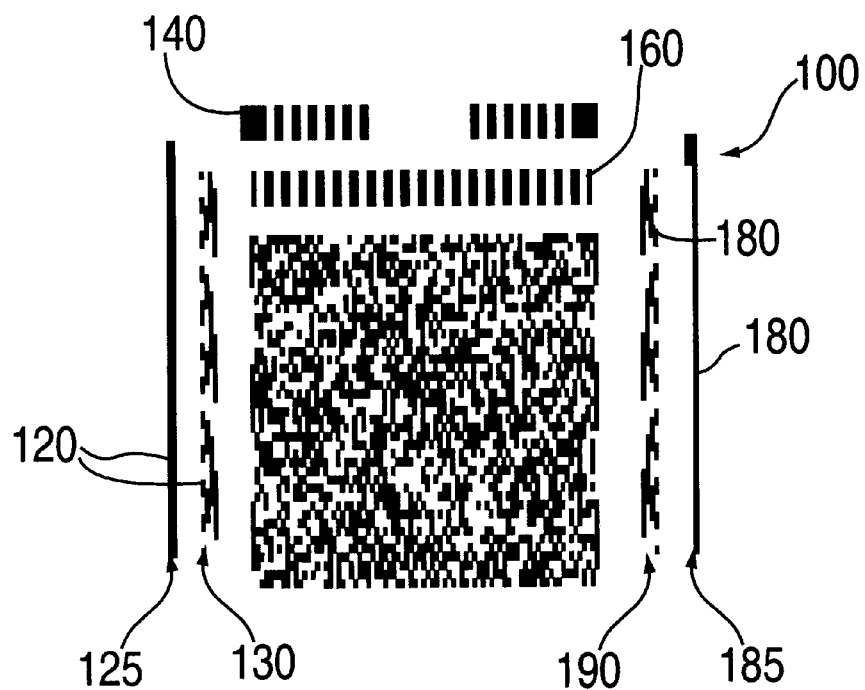
FIG. 2B is an exploded view of the two-dimensional, high-density, damage-tolerant printed code of the present invention.
Figure 3:
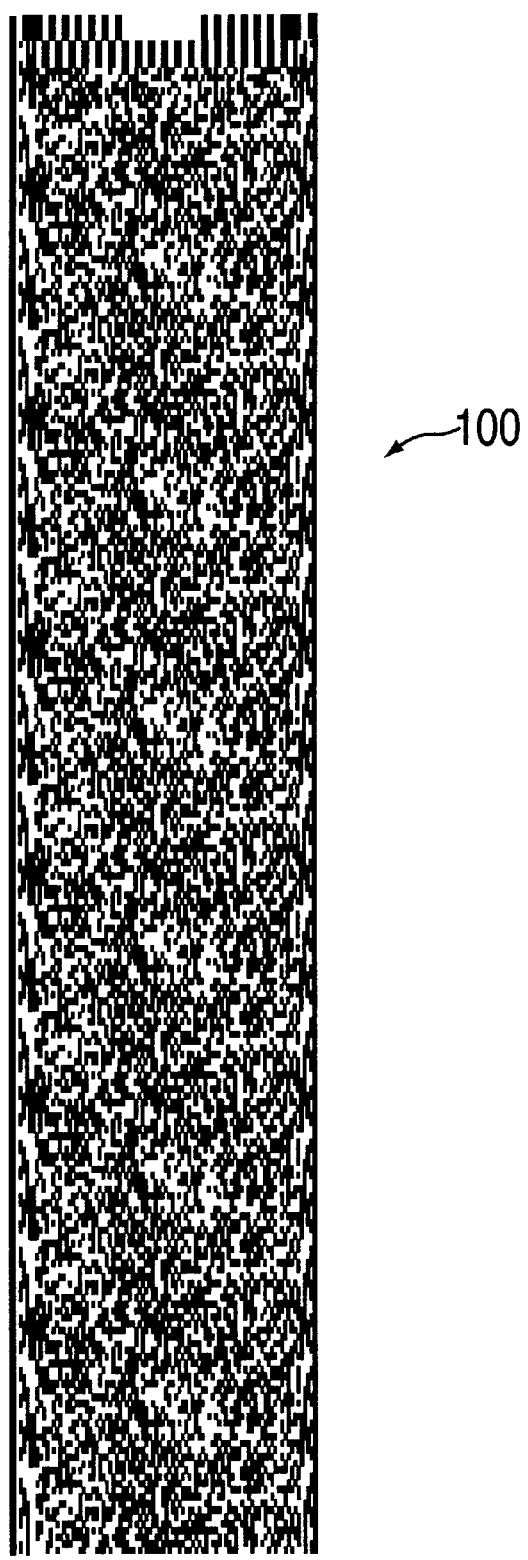
FIG. 3 is another view of the two-dimensional, high-density, damage-tolerant printed code of the present invention.

FIGS. 2A–B depict a first preferred embodiment made in accordance with the invention. The two-dimensional, high-density, damage-tolerant printed code 100 comprises a left framing pattern 120; a horizontal header section 140; a vertical header section 160; a right framing portion 180; and an encoded user data portion 200.

The two-dimensional, high-density, damage tolerant printed code 100 is depicted in FIGS. 2A–B as being printed on paper, but the code 100 can be printed, etched, or photographically formed on numerous substrates, both transparent and opaque, including transparent plastic; film; opaque vinyl; opaque plastic; metal; and semiconductor material.

Collectively, the left framing portion; the horizontal header section 140; the vertical header section 160; and the right framing portion 180 provide information to an optical scanner capable of operating with the printed code 100 to significantly ease data recovery. In a preferred embodiment, the left framing portion 120 and right framing pattern 180 are in turn comprised of a start pattern 125; a left row address pattern 130; a right row address pattern; and a stop pattern 185. In the case of a raster scanning device, the start pattern 125 and stop pattern 185 serve to demarcate the printed code 100 from the adjacent quiet zone 80 surrounding the code 100. In area capture devices, e.g., two-dimensional charge-coupled devices (2D CCDs), the start and stop patterns 125, 185 and header sections 140, 160 serve to provide image orientation information to the area cpature device to facilitate decoding of the printed code 100.

The left address pattern 130 and right row address pattern 190 are comprised of four-bit (sixteen state) gray codes. Within a localized region of the code 100, the row address patterns 130, 190 provide unique row address information that can be used by a flying spot scanner to track row position during decoding operations, or by a 2D CCD to facilitate decoding of the encoded user data portion 200 of the printed code.

The pattern shown on each line is a 4 bit (16 state) reflected gray code. The pattern for each state is shown below:

| Sequence number | Bit string | Sequence number | Bit string |
| --- | --- | --- | --- |
| 0 | 0000 | 8 | 1100 |
| 1 | 0001 | 9 | 1101 |
| 2 | 0011 | 10 | 1111 |
| 3 | 0010 | 11 | 1110 |
| 4 | 0110 | 12 | 1010 |
| 5 | 0111 | 13 | 1011 |
| 6 | 0101 | 14 | 1001 |
| 7 | 0100 | 15 | 1000 |

As with any gray code all 4 bits can be exclusively or'ed to generate a clock signal that changes when passing from one row of data to the next.

The central section of the two-dimensional, high-density, damage-tolerant printed code 100 is encoded user data portion 200. User data is encoded in portion 200 in bit areas which may be printed or blank in the case of opaque media, or transparent/opaque in the case of transparent media. These bit areas form a regular rectangular grid. The width of the grid is defined by the value encoded in the horizontal header 140. The length of the grid extends from the leading vertical header to the end of the code 100. The data on this grid is stored in rectangular blocks whose dimensions may be defined in the value encoded in the vertical header 160.

User data is encoded into the bit areas one bit at a time in sequential order starting from the upper rightmost portion of the encoded user data portion 200, in a line-by-line sequence to the bottom of the encoded user data portion 200. Following the user data encoded in data portion 200 is error correction information.

Error detection and correction in the preferred embodiment is performed using the Reed-Solomon error correction algorithm. Mathematically, Reed-Solomon codes are based on the arithmetic of finite fields. Indeed, the 1960 paper[1] begins by defining a code as "a mapping from a vector space of dimension m over a finite field K into a vector space of higher dimension over the same field." Starting from a "message" $(a\_0, a\_1, \ldots, a\_{m-1})$, where each $a\_k$ is an element of the field K, a Reed-Solomon code produces $(P(0), P(g), P(g^2), \ldots, P(g^{N-1}))$, where N is the number of elements in K, g is a generator of the (cyclic) group of nonzero elements in K, and P(x) is the polynomial $a\_0+a\_1x+\ldots+a\_{m-1}x^{m-1}$. If N is greater than m, then the values of P over determine the polynomial, and the properties of finite fields guarantee that the coefficients of P—i.e., the original message—can be recovered from any m of the values.

[1] 1960 Journal of the Society for Industrial and Applied Mathematics. "Polynomial Codes over Certain Finite Fields," by Irving S. Reed and Gustave Solomon. This is the seminal paper that describes the error correcting method.

Conceptually, the Reed-Solomon code specifies a polynomial by "plotting" a large number of points. And just as the eye can recognize and correct for a couple of "bad" points in what is otherwise clearly a smooth parabola, the Reed-Solomon code can spot incorrect values of P and still recover the original message. Combinatorial reasoning (and linear algebra) establishes that this approach can cope with up to s errors, as long as m, the message length, is strictly less than N−2s.

There are numerous coding theory textbooks known to those skilled in the art which describe the error-correcting properties of Reed-Solomon codes in detail. Here is a brief summary of the properties of the standard (non extended) Reed-Solomon codes implemented in this symbology:

MM—the code symbol size in bits

KK—the number of data symbols per block, KK<NN

NN—the block size in symbols, which is always (2**MM—1)

JJ—The number of actual data values in the block.

The error-correcting ability of a Reed-Solomon code depends on NN−KK, the number of parity symbols in the block. In the pure error-correcting mode the decoder can correct up to (NN−KK)/2 symbol errors per block and no more.

The decoder can correct more than (NN−KK)/2 errors if the calling program can say where at least some of the errors are. These known error locations are called "erasures". (Note that knowing where the errors are isn't enough by itself to correct them because the code is non-binary—we don't know which bits in the symbol are in error.) If all the error locations are known in advance, the decoder can correct as many as NN-KK errors, the number of parity symbols in the code block. (Note that when this many erasures is specified, there is no redundancy left to detect additional uncorrectable errors so the decoder may yield uncorrected errors).

In the most general case there are both errors and erasures. Each error counts as two erasures, i.e., the number of erasures plus twice the number of non-erased errors cannot exceed NN−KK. For example, a(255,223) Reed-Solomon code operating on 8-bit symbols can handle up to 16 errors OR 32 erasures OR various combinations such as 8 errors and 16 erasures.

Figure 4:
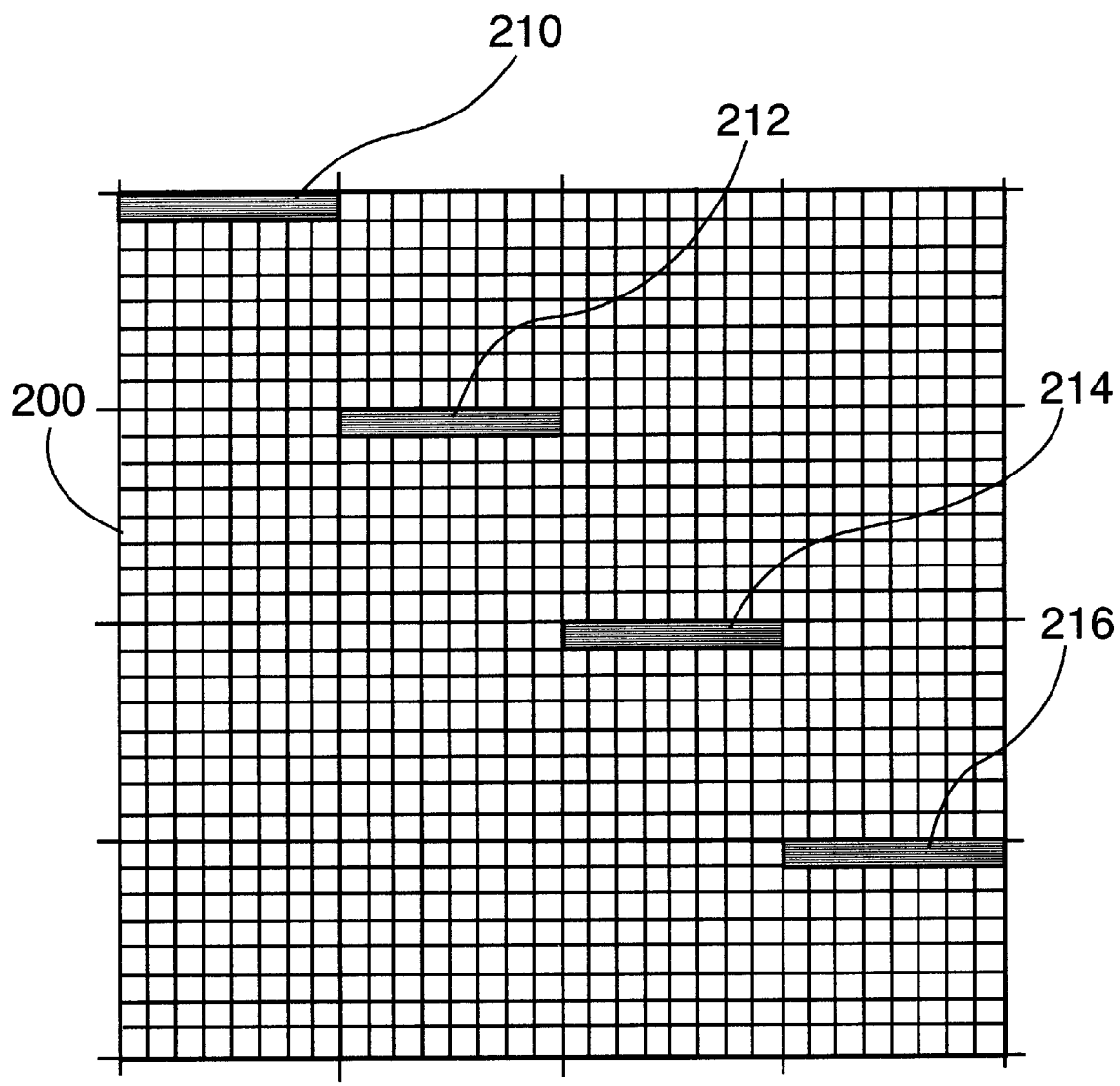
FIG. 4 depicts a portion of the encoded data portion section of the printed code of the present invention, and further depicts those non-contiguous bits that are error-corrected on a group basis.

The foregoing Reed-Solomon error correction principles may be applied in a preferred embodiment of the present invention in the manner depicted in FIG. 4. FIG. 4 depicts in conceptual form the arrangement of user data bits as they will appear in the encoded user data portion 200 of the code 100 when printed. The error correction methods take the eventual printed arrangement into consideration. FIG. 4 depicts sixteen eight bit by eight bit regions. A subunit of eight bits from four of the eight bit by eight bit regions 210, 212, 214 and 216 (e.g., a byte comprising the most significant bits of each eight bit by eight bit region) are selected and then combined into an error correction packet for error correction purposes. A conventional error correction algorithm (e.g., Reed Solomon, although others may be substituted for Reed Solomon) is then applied to this first error correction packet for error correction purposes. A number of error correction bits are created, and these are appended to the end of the user information portion. The process is then repeated by selecting the next most significant bits from each eight bit by eight bit region and combining them into an error correction packet for error correction purposes. The error correction algorithm is then applied to this second error correction packet to create a number of error correction bits. These error correction bits are then appended to the user information and first collection of error correction bits. The process is repeated until all the information in the first four eight bit by eight bit regions has been error corrected. The process is then continued by selecting the four new eight bit by eight bit regions and repeating the process. When all the user data has been error-corrected, the combined user data and error correction information is formatted into a file that, when printed, will constitute a two-dimensional, high-density, damage-tolerant, printed code.

Figure 5:
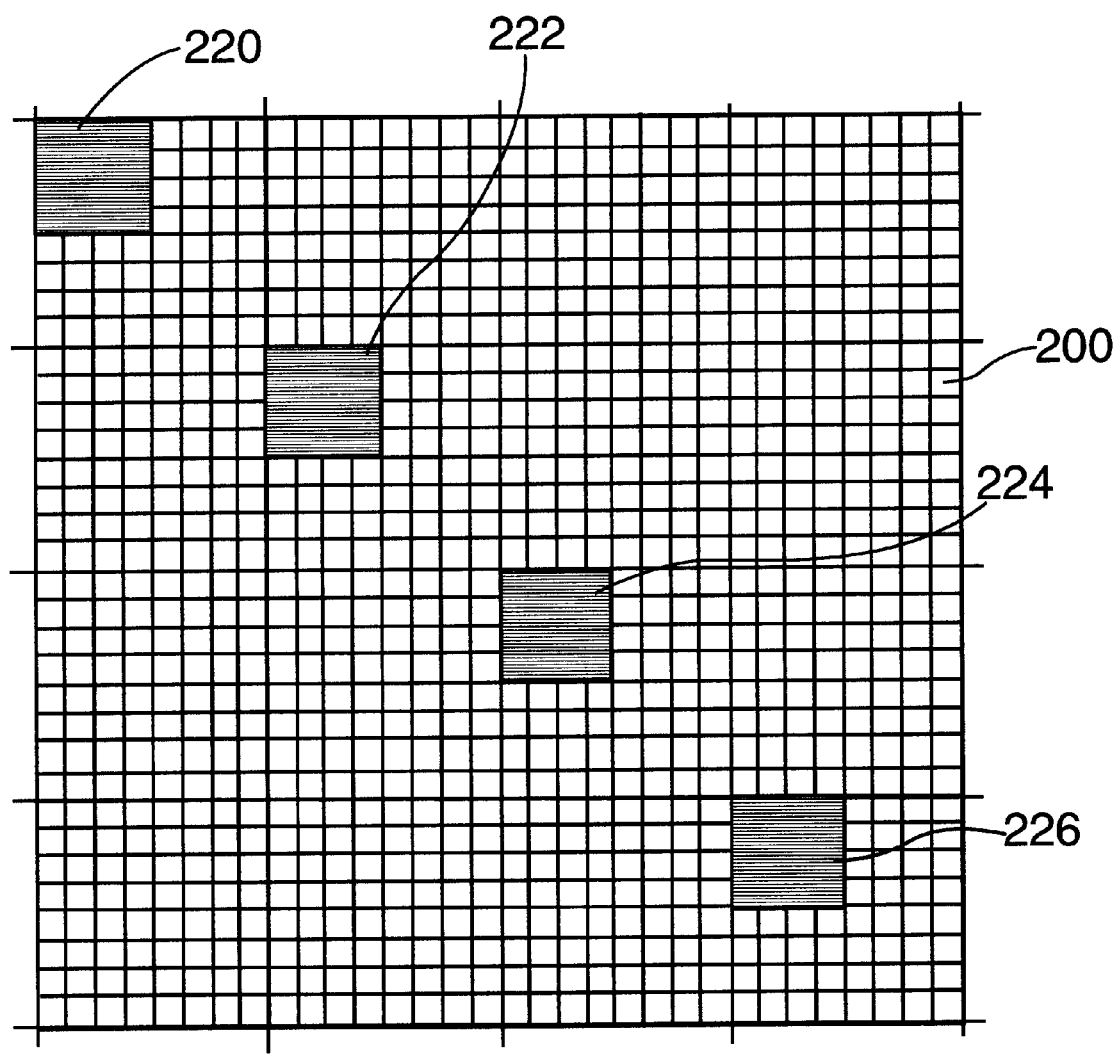
FIG. 5 depicts a portion of the encoded data portion section of the printed code of the present invention, and further depicts those non-contiguous bits that are error-corrected on a group basis.

Another preferred embodiment applies the foregoing error correction principles in the manner depicted in FIG. 5. FIG. 5, like FIG. 4, depicts in conceptual form the arrangement of user data bits as they will appear in the encoded user data portion 200 of the code 100 when printed. The error correction methods take the eventual printed arrangement into consideration. FIG. 5 depicts sixteen eight bit by eight bit regions. A two-dimensional (four by four) subunit of sixteen bits from four of the eight bit by eight bit regions 220, 222, 224 and 226 (i.e., two bytes) are selected and then combined into an error correction packet for error correction purposes. A conventional error correction algorithm (e.g., Reed Solomon, although others may be substituted for Reed Solomon) is then applied to this first error correction packet for error correction purposes. A number of error correction bits are created, and these are appended to the end of the user information portion. In the next step, another group of sixteen contiguous bits are selected from each of the four packets and combined and then error corrected to create error correction bits. The process is repeated until error correction information has been created for all user data in the first four eight bit by eight bit regions. The process is continued by performing the same operations on the next four eight bit by eight bit regions, and is completed when error correction information has been created for all user data.

This process can be generalized in the following manner. The user data is first arrayed in computer memory in the row-column sequence in which it is to be printed in the two-dimensional, high-density, damage-tolerant printed code. The row-column organized information is then divided into a number of two-dimensional packets of (n, m) dimension that represent contiguous bits to be printed in the two-dimensional printed code. A subunit of bits is selected from each of said two-dimensional packets of (n, m) dimension and combined into a first error correction packet for error correction purposes. An error correction algorithm is then applied to the first error correction packet. The error bits thus created in this first step are next formed into a two-dimensional collection of bits to be printed contiguously after the user data. The process is continued until error correction information is created for all user information.

Other manners of selecting non-contiguous bits and performing error correction on them that would still provide a minimum distance between codewords or bits are within the scope of this invention and may include selecting m bits every n bits; e.g., selecting the bits 1, 9, 17, 25 . . . in sequence and combining them for error correction purposes, and then selecting bits 2, 10, 18 , 26 . . . and combining them for error correction purposes, and repeating the sequence until bits 8, 16, 24 . . . are reached.

It is clear from the foregoing description that error correction is being performed on non-contiguous portions of data. This makes the code more damage tolerant. In order to accomplish these operations, it is necessary to encode the user data length and level and manner of error correction in a control data portion of the code that in a preferred embodiment usually precedes the user data in the encoded user data portion 200. Due to the relatively complex manner of applying error correction in the invention, the user information may be difficult to recover in the event of damage to that portion of the code encoding the control data. Therefore in another preferred embodiment of the invention this information is error corrected separately from the remaining user data and geographically dispersed throughout the code.

Figure 6:
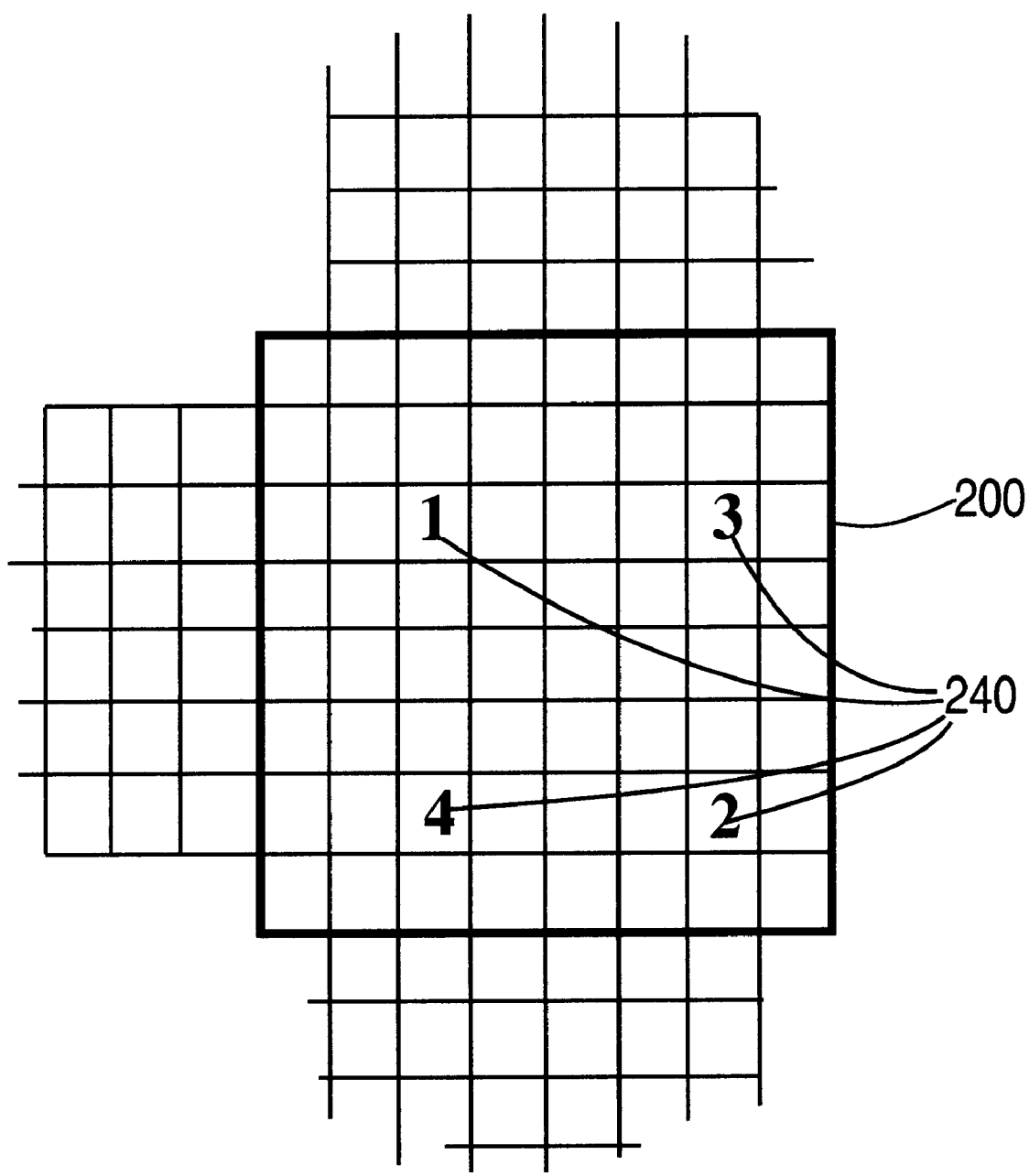
FIG. 6 depicts a portion of the encoded data portion section of the printed code of the present invention, and shows where control data error correction bits may be inserted into the user data.
Figure 7A:
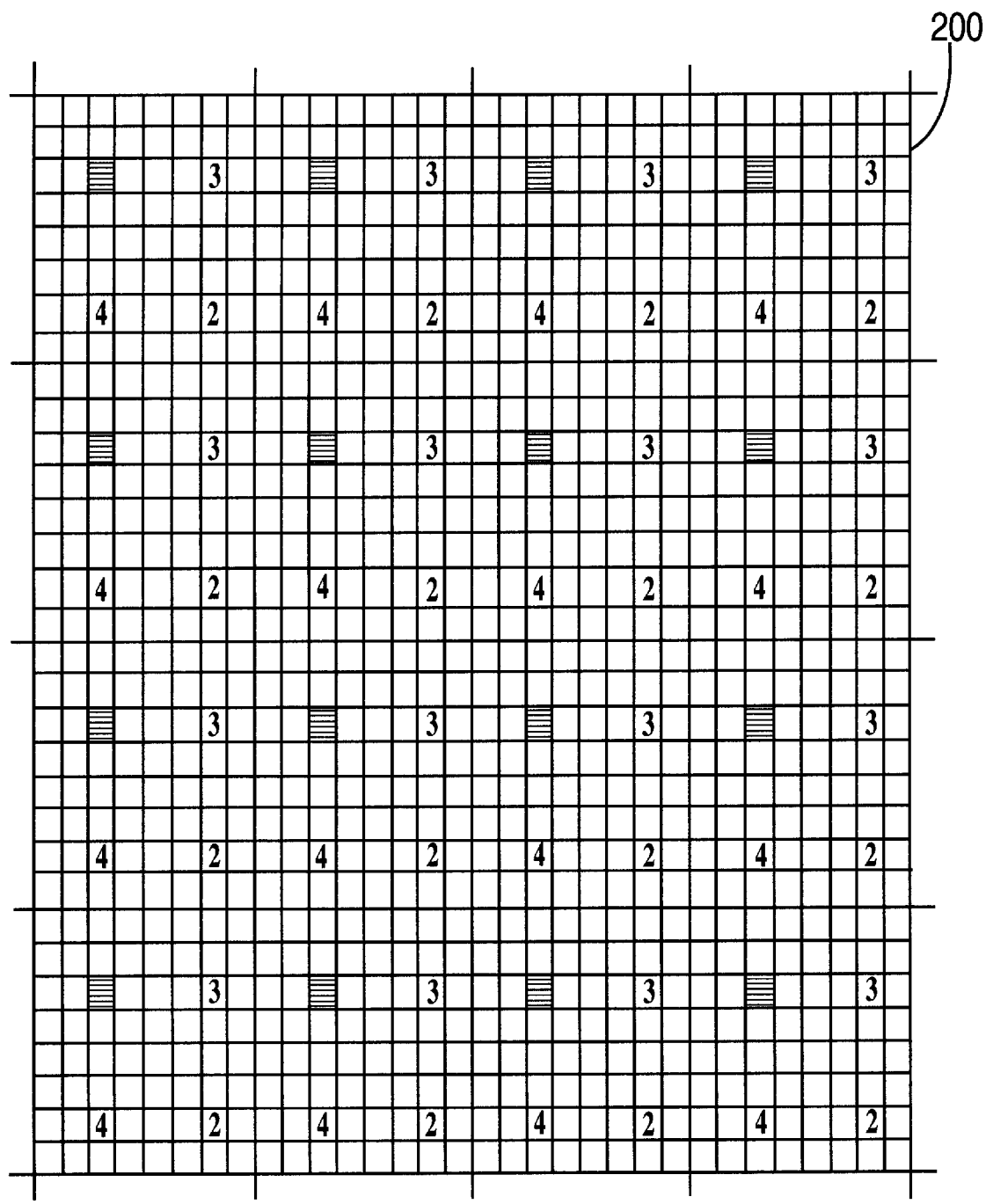
FIG. 7A depicts multiple portions as in FIG. 6, and further depicts those bit positions in which control data error correction bits are inserted.
Figure 7B:
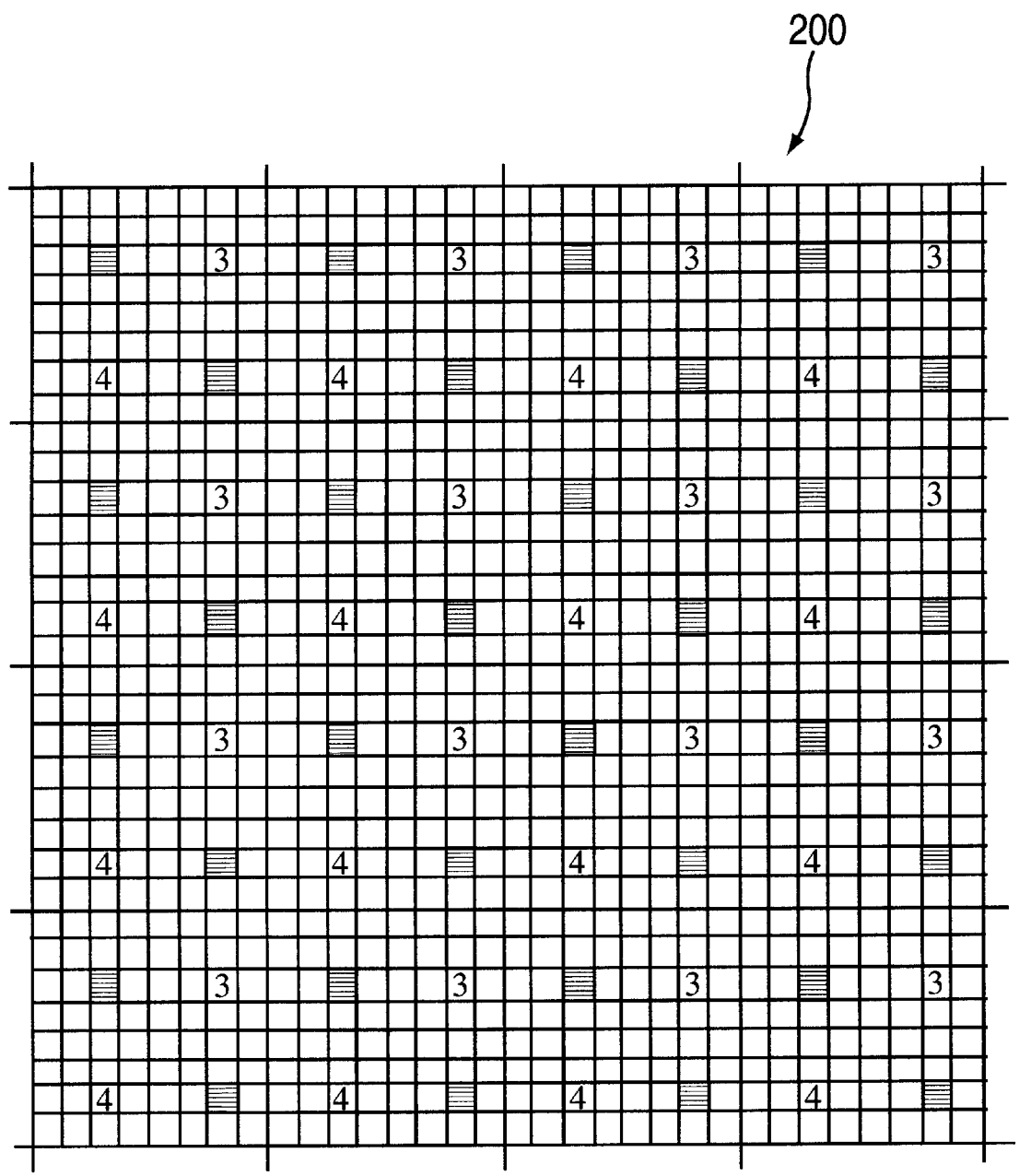
FIG. 7B depicts multiple portions as in FIG. 6, and further depicts those bit positions in which control data error correction bits are inserted.
Figure 7C:
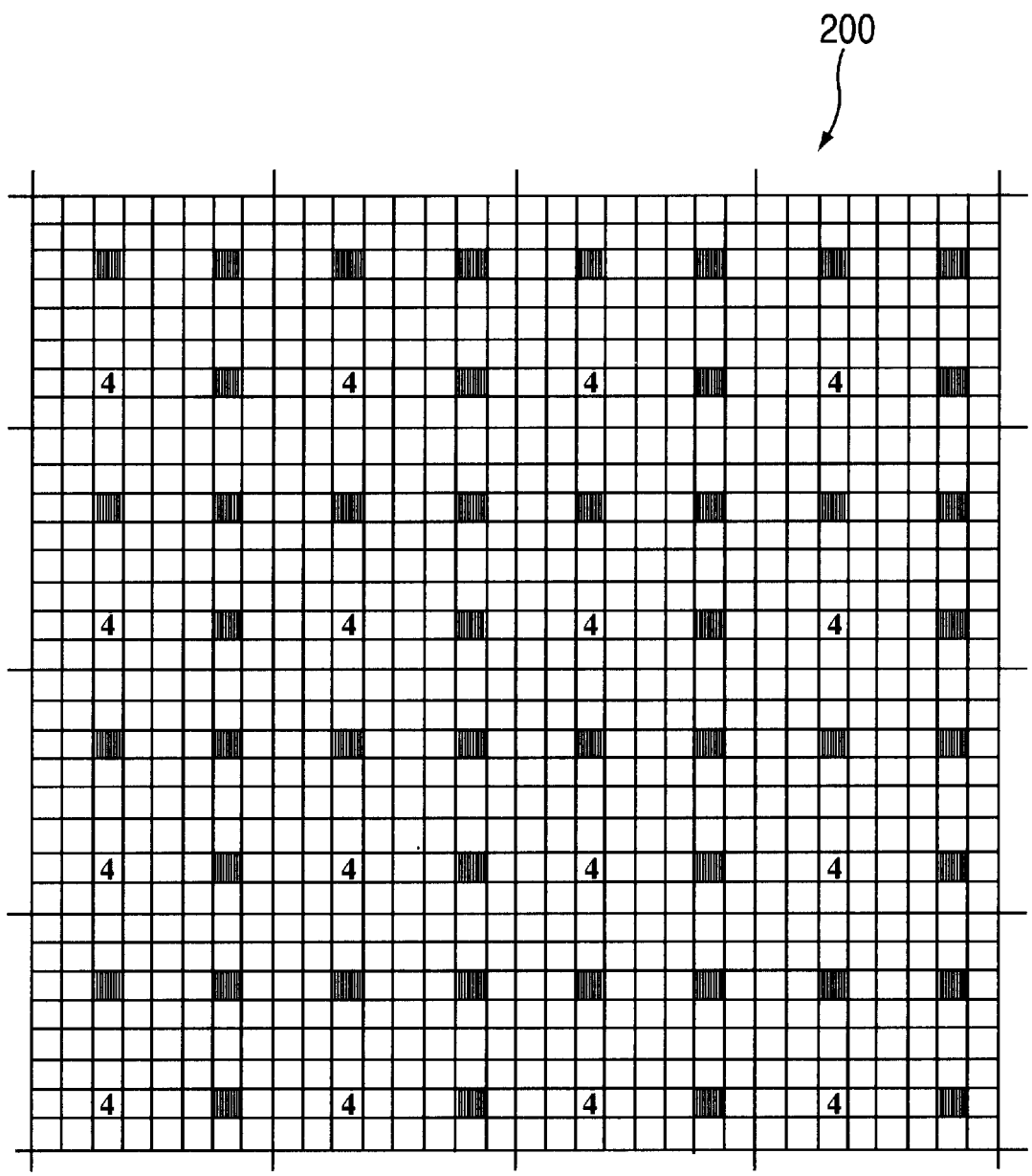
FIG. 7C depicts multiple portions as in FIG. 6, and further depicts those bit positions in which control data error correction bits are inserted.
Figure 7D:
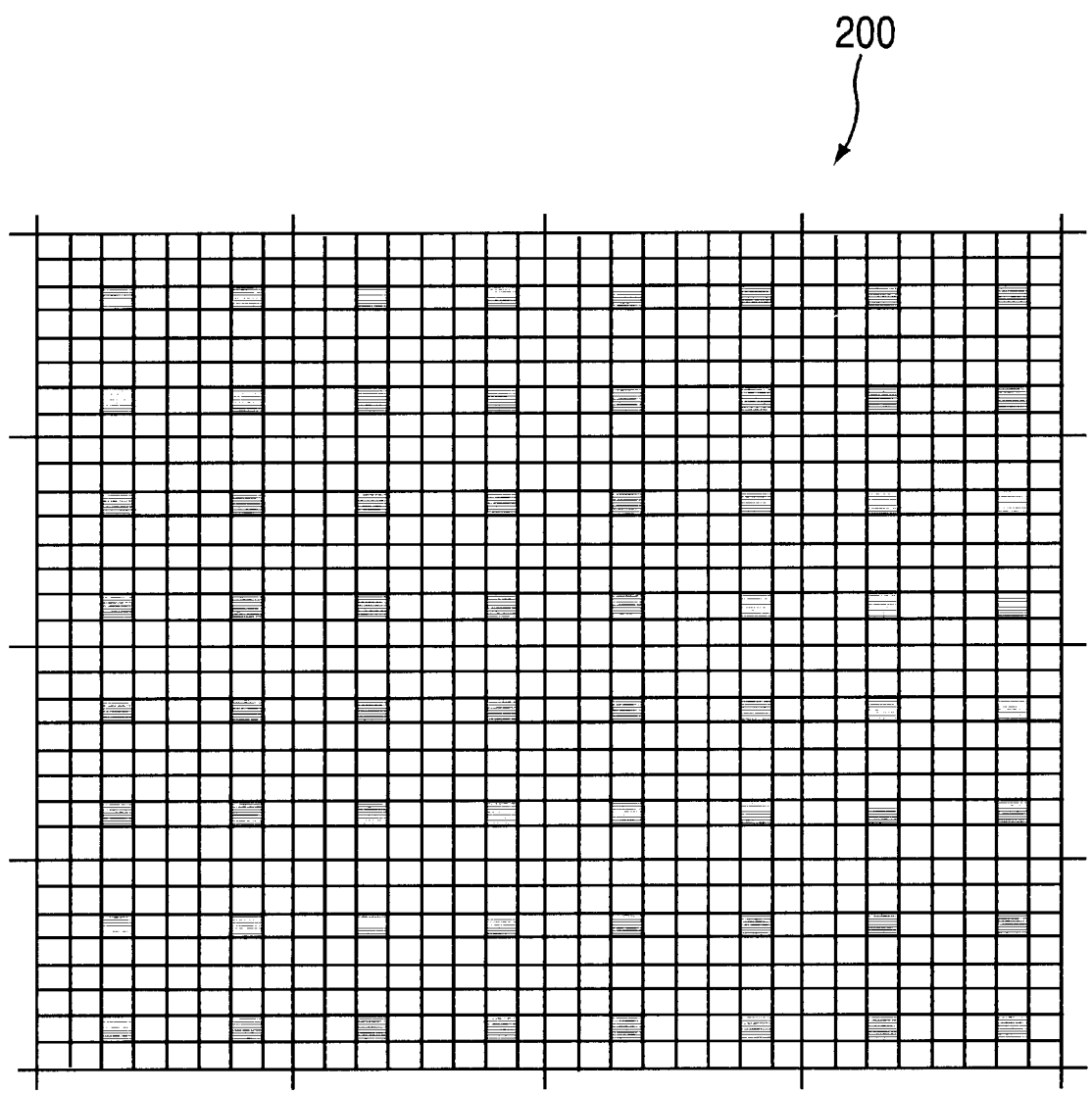
FIG. 7D depicts multiple portions as in FIG. 6, and further depicts those bit positions in which control data error correction bits are inserted.
Figure 8:
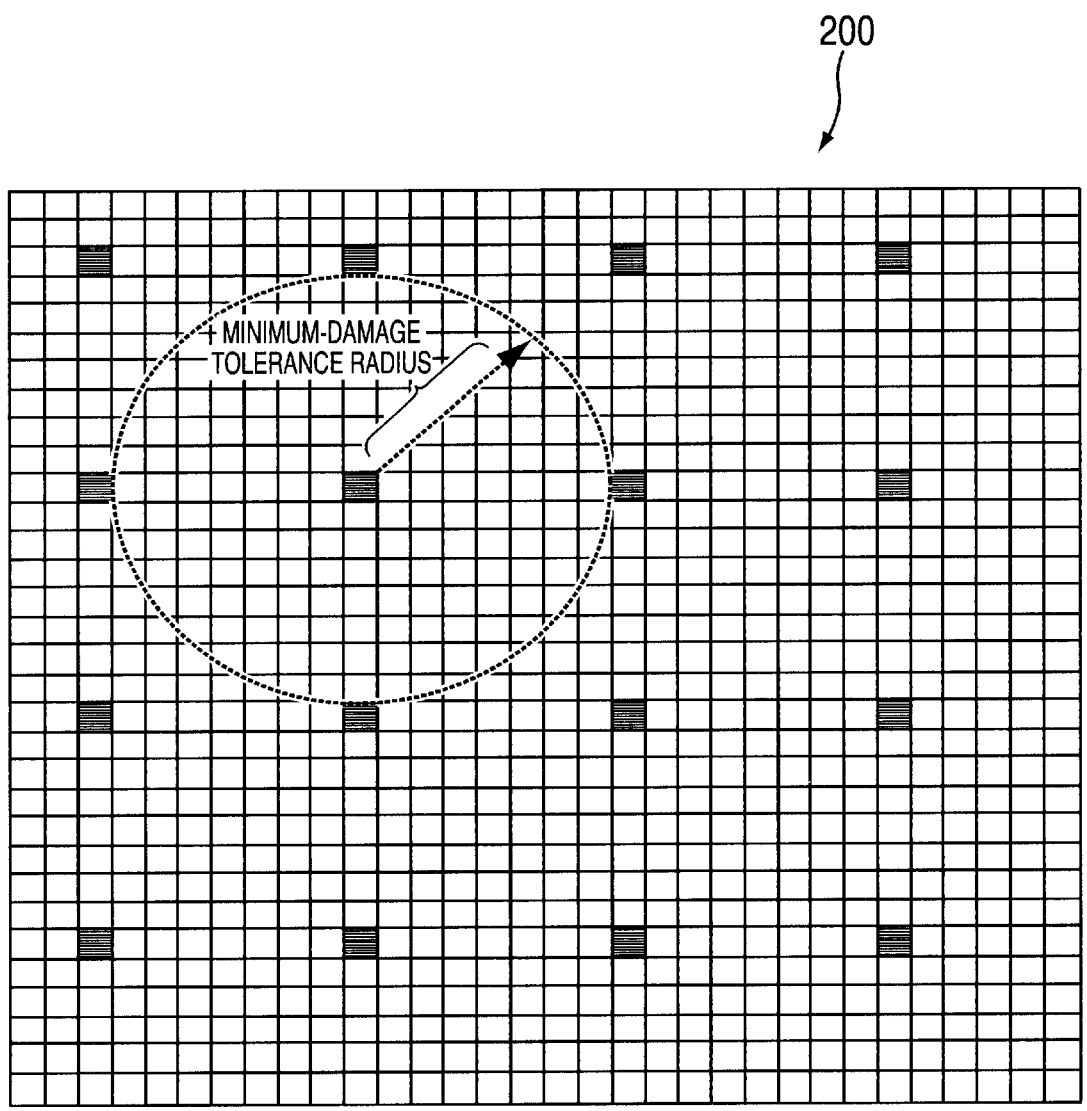
FIG. 8 depicts how distributing the control data error correction bits throughout the code increases the damage large area damage tolerance of the code.

The operation of this aspect of the invention is depicted in FIGS. 6 and 7A–D. FIG. 6 depicts in conceptual form one of a number of eight bit by eight regions that will constitute a part of the encoded user data portion 200 of the code 100. Depending on the level of error correction information desired for the control data, a portion of the error correction information associated with the control data may be inserted at bit positions labeled 1, 2, 3 and 4. For example, if a relatively low level of error correction were to be selected, a single error correction bit would be encoded at bit position labeled "1." When this scattering method is applied to all of the eight bit by eight bit regions of the code, the error correction information associated with the control data is distributed throughout the code in the manner depicted in FIG. 7A. If a relatively high level of error correction of the control data were to be selected, four error correction bits would be distributed in each eight bit by eight bit region of the code as depicted in FIG. 7D. Intermediate cases are depicted in FIGS. 7B and 7C.

In fixed length format codes, this information may be interspersed at known locations throughout the code to provide robust damage tolerance. In variable length and error correction codes, the header can store the location of the control data error correction bits by encoding a number corresponding to one from a number of options. This indicates where the reader should look for the error correction bits corresponding to the control data in the case of catastrophic damage to the control data portion of the code.

Two-dimensional, high-density, damage-tolerant printed codes made in accordance with the foregoing embodiments are capable of encoding 2800 bytes of information (sufficient for multiple biometrics (fingerpints and image) and text) with a robust level of error correction resulting in an overall message length of 3400 bytes. The information would be printed in a code having an encoded user data portion of 0.84 inches by 2.87 inches (the minimum feature having a size of 0.0066×0.010 inches). Such a printed code would easily fit on a portion of one side of a conventional 2.125×3.375 inch card, leaving substantial space for human readable information on the remaining portion of the card. Other minimum feature sizes that fall within the scope of the invention may be selected that achieve relatively lesser or greater density.

C. Preferred Embodiments of Identification Papers

Figure 9:
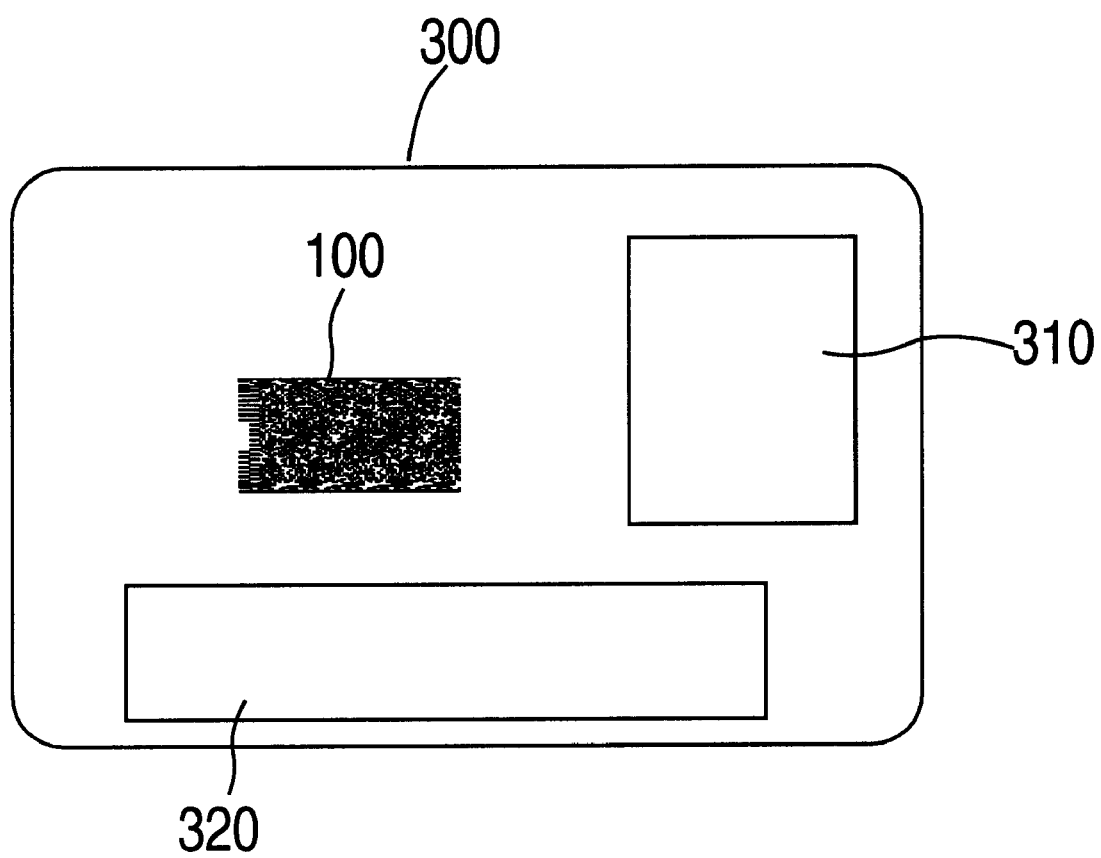
FIG. 9 depicts a conventionally-sized ISO card bearing a two-dimensional, high-density, damage-tolerant printed code of the present invention.

A preferred embodiment of the present invention showing its use in a positive identity verification application is depicted in FIG. 9. A conventionally-sized ISO card 300 bears a two-dimensional printed code 100, and includes a region for a photograph 310, and a region for text 320. Due to the increased information capacity of the two-dimensional, high-density, damage-tolerant printed code of the present invention, printed code 100 can store multiple fingerprint templates, photographic information and text.

D. Preferred Embodiments of Off-Line, Fully Integrated Identity Verification Apparatus A yet further embodiment of the present invention comprises a fully-integrated, compact, portable or stationary, off-line positive identity verification apparatus having means for capturing an image of a two-dimensional, high-density, damage tolerant printed code; real-time biometric capture capabilities (e.g., fingerprints); a microprocessor and associated programming for comparing real-time biometric information captured from an individual whose identity is sought to be verified with the biometric information recovered from a two dimensional printed code; and indication apparatus to indicate whether as a result of the biometric comparison process the individual has been identified as authentic or an imposter.

The means for capturing the image of the two-dimensional, high density, damage tolerant code can comprise, for example, a two-dimensional charge-coupled-device (CCD) image sensor, two-dimensional CMOS image sensor or other suitable two-dimensional imaging device focused on the surface of a substrate bearing the two-dimensional printed code. Alternatively, linear sensor such as a linear CCD, linear CMOS image sensor, linear contact image sensor (CIS) or other suitable linear image sensor device can be focused on a substrate to capture a two-dimensional printed code and "swept" across the surface substrate to capture a two-dimensional image thereof. The "sweeping" action can be accomplished either by moving the substrate relative to the linear image sensor or by moving the linear sensor relative to the substrate, in the manner of a conventional fax machine or flatbed scanner.

Yet another technique known in the art suitable for capturing a two-dimensional image of a two-dimensional printed code comprises capturing multiple images of the two-dimensional image of a two-dimensional printed code using a two-dimensional image sensor, wherein each of the images thus captured represents only a portion of the two-dimensional printed code, and "stitching" the multiple images together into a single image representative of the entire two-dimensional printed code. This can be accomplished by sweeping the two-dimensional printed code past a two-dimensional image sensor incapable of capturing the entire two-dimensional printed code in a single image. Multiple overlapping "snapshot" images are captured via the two-dimensional image sensor as the two-dimensional printed code is swept by. The image-to-image overlap (boundary correlation) is analyzed in software and the images of "fused" to produce a single, coherent image. This technique has been employed previously with "hand scanner" devices such as the "Logitech ScanMan."

Figure 10:
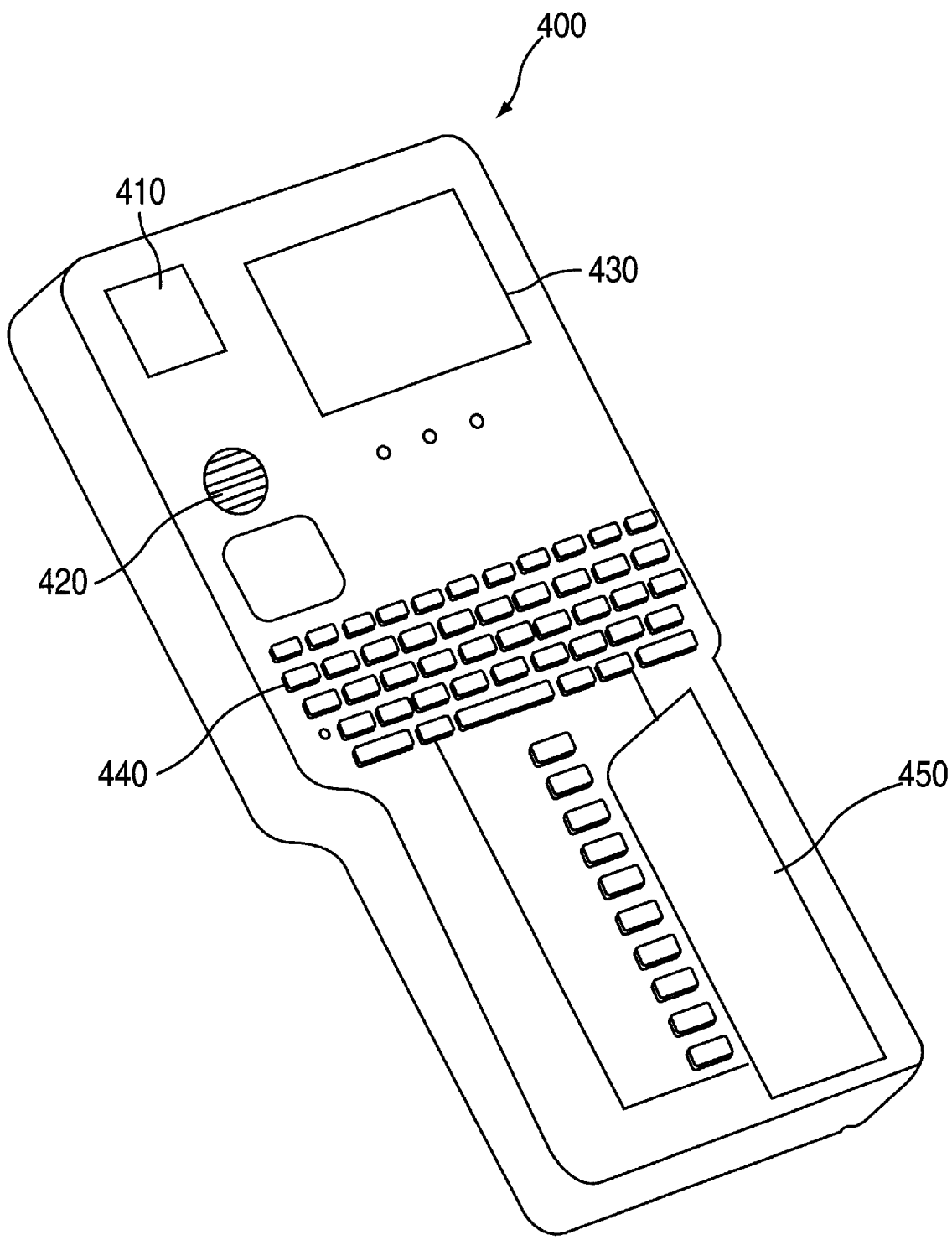
FIG. 10 depicts a front perspective view of a fully-integrated, compact, hand-held positive identity verification apparatus of the present invention.

FIG. 10 is a front perspective view of one embodiment of a fully-integrated, compact, hand-held positive identity verification apparatus 400, including a fingerprint image scanner 410 (real-time biometric capture device), and audio transducer 420, a display unit 430, a keypad input device 440 and a two-dimensional image scanner 450.

Figure 11:
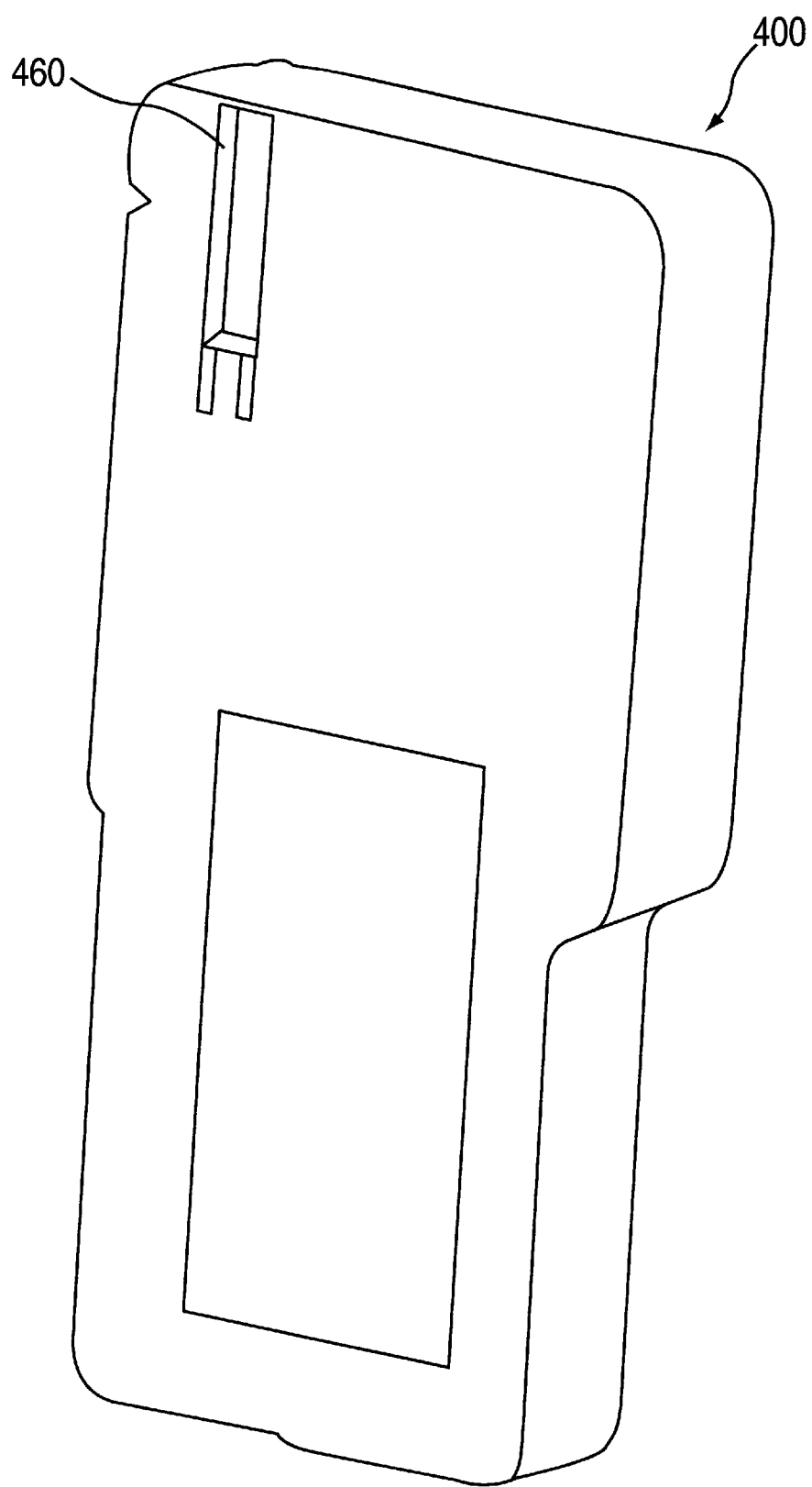
FIG. 11 depicts a rear perspective view of a fully-integrated, compact, hand-held positive identity verification apparatus of the present invention.

FIG. 11 is rear perspective view of the same fully-integrated, compact, hand-held positive identity verification apparatus 400, further showing a PCMCIA card 460.

In the preferred embodiment, the two-dimensional image scanner 450 comprises a swept contact image sensor (CIS) device having sufficient resolution to reliably resolve and distinguish features as small as 0.0066 inches in any dimension (preferably 400 dpi or greater).

In the preferred embodiment, the fingerprint image scanner 410 is a commercially available, miniature unit such as the DFR-200 manufactured by Identicator Technology of 1150 Bayhill Dr., San Bruno, Calif. Those of ordinary skill in the art will readily understand that other fingerprint scanning devices and/or other biometric capture devices (such as a camera device for iris scanning and/or facial recognition) may readily be employed, either as alternative or as augmentations.

The display device 430 is a full-color active-matrix display capable of displaying a color photographic image. In other embodiments, however, a monochrome display, text-only display, or simple indicators may be substituted depending upon application-specific display requirements. In access-control applications, for example, it may only be necessary to indicate a simple "pass" or "fail" condition, requiring no more than one or two indicator lights.

The audio transducer 420 is a non-essential element provided to augment the user interface to the identity verification apparatus 400.

The keypad input device 440 provides a user with text input and function selection capability, useful in applications where there are multiple modes of operation or where it is anticipated that entry of additional textual information relevant to the identity verification will be required (e.g., traffic ticket, voter registration, border control applications, etc.). In other applications where there is little or no need for additional text information, the keypad input device 440 could be replaced with a small set of function keys, or eliminated altogether.

The PCMCIA card 460 shown in FIG. 11 is representative of one of many possible external interfaces to the identity verification unit. A PCMCIA card may be used, for example, to add network connectivity for transaction logging, or to add peripheral devices such as printers, mass storage devices, magnetic stripe readers, etc. Those of ordinary skill in the art to which the invention most nearly pertains will readily understand the similar usefulness and applicability of other interfaces, such as serial communications, a parallel printer port, IrDA communications, Ethernet, etc., and will immediately understand how to implement such interfaces.

Figure 12:
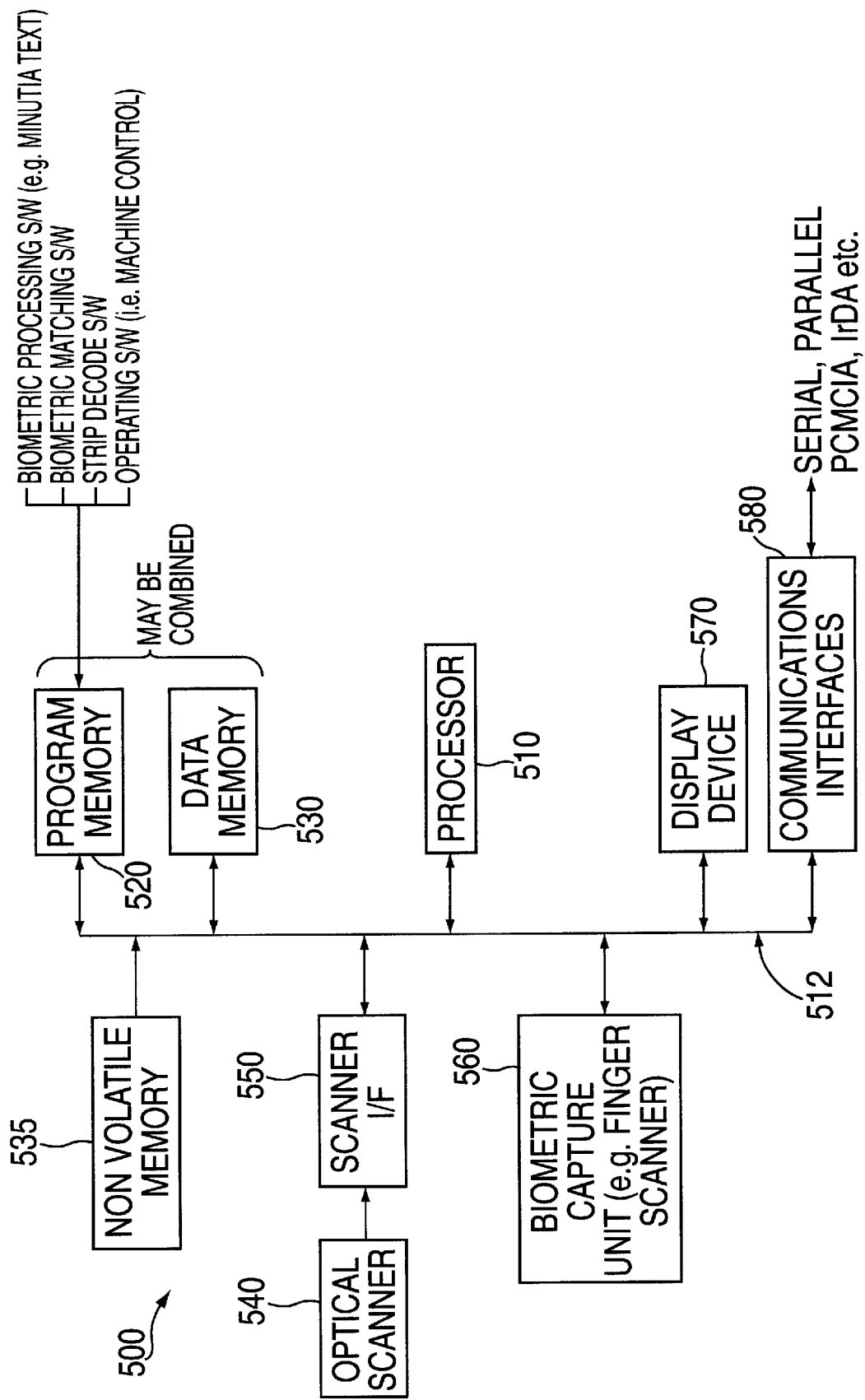
FIG. 12 depicts a functional block diagram showing the functional elements of the fully-integrated, compact, hand-held positive identity verification apparatus of the present invention.

FIG. 12 is a functional block diagram 500 of the preferred embodiment depicted in FIGS. 10 and 11 showing the major functional elements thereof. A processor 510, such an Intel SA 1100 StrongARM microprocessor connects to other elements of the system via a microprocessor bus 512. Program memory 520 is preferably Flash EPROM, and is used to store programs and algorithms for governing the operation of the identity verification unit (ref 500). These programs and algorithms include: software for processing biometric information (e.g., fingerprint minutia extraction), software for biometric matching (e.g., fingerprint matching), software for decoding a two-dimensional printed code, and operating software (e.g., an operating system and code for machine control). Data memory 530 is random access memory (RAM), preferably of the DO or SDRAM type, and is used to store captured images, biometric data, and to store intermediate results of calculations. In one preferred embodiment, program memory 520 and data memory 530 are effectively combined into a single memory by copying all programs into RAM for execution. By doing this, slower and less expensive program memory can be used for storing programs and algorithms. When executed from RAM, which is typically much faster than Flash EPROM, it becomes economical to use the same data memory 530 for both program and data storage purposes. Non-volatile memory 535 is used for storing long-term information such as transaction logs, configuration information, authorization lists, etc. Preferably, non-volatile memory 535 is Flash EPROM, disk storage, or other non-volatile medium. In the event that Flash EPROM is used, non-volatile memory 535 and program memory 520 can be combined into a single memory.

An Optical Scanner 540 provides means for capturing a two-dimensional image of a two-dimensional printed code, such as the high-density, error-corrected, damage-tolerant printed code described hereinabove. In a preferred embodiment, the optical image sensor 540 comprises a linear contact image sensor (CIS) with a transport mechanism for sweeping it across the surface of a substrate (in a near-contact therewith) bearing the aforementioned two-dimensional printed code. Scanner interface 550 processes signals from the optical scanner 540, converting them into a digital form suitable for storage into data memory 530 for software decoding.

A Biometric Capture Unit 560 provides live biometric data from a subject individual to be verified. In the preferred embodiment, the Biometric Capture Unit 560 is fingerprint image scanner. Data captured by the Biometric Capture Unit 560 is ultimately stored and analyzed in data memory 530.

A Display Device 570 provides visual information to a user of the identity verification unit 400. In a preferred embodiment, the display device is a full-color, active matrix, graphical display unit capable of displaying color text and graphical information such as a color photograph and associated descriptive text.

Communications interfaces 580 are provided for the purpose of communicating with external devices or computers. In the preferred embodiment, the communications interfaces 580 include a serial port, a parallel port (both of the type commonly found on personal computers), and IrDA (infrared data access) port and a PCMCIA port. Thus it is seen that a two-dimensional, high-density, damage-tolerant printed code is provided. Persons skilled in the art will appreciate that the present invention can be practiced by other than the described preferred embodiments, which are presented for the purposes of illustration and not of limitation, and the present invention is therefore only limited by the claims that follow.

What is claimed is:

1. A two-dimensional, high-density, damage-tolerant printed code printed on a substrate, the two-dimensional printed code encoding information for scanning and decoding by an optical scanner and comprising:

a decode information portion encoding information to be used by the optical scanner to assist in reading and decoding the printed code;

a demarcation portion to demarcate a lateral extent of the printed code from an adjoining portion of the substrate;

row address portions encoding row address information to be used by the optical scanner to assist in reading and decoding the printed code;

a two-dimensional encoded information portion wherein user information and error-correction information is encoded in bit areas disposed in a row-column arrangement, where said bit areas may be printed or blank to encode such information;

said error correction information comprising a plurality of error correction bit groups, each error correction bit group being separately calculated from a corresponding one of a plurality of error correction packets of subunits of user information encoded in said encoded information portion, each subunit of user information in each error correction packet being constituted of bits encoded in bit areas in the encoded information portion which are displaced row-wise and column-wise from bit areas in which are encoded the bits constituting the other subunits in the error correction packet.

2. The two-dimensional, high-density, damage-tolerant printed code of claim 1 wherein:

said error correction information appended to said information portion is calculated using a block-oriented error correction algorithm.

3. The two-dimensional, high-density, damage-tolerant printed code of claim 2 wherein:

said error correction algorithm is the Reed-Solomon method.

4. The two-dimensional, high-density, damage-tolerant printed code of claim 1 wherein:

said error correction information appended to said information portion is calculated using a convolutional code.

5. A substrate bearing a two-dimensional, high-density, damage-tolerant printed code encoding information for scanning and decoding by an optical scanner, the code comprising:

a decode information portion encoding information to be used by the optical scanner to assist in reading and decoding the printed code;

a demarcation portion to demarcate a lateral extent of the printed code from an adjoining portion of the substrate;

row address portions encoding row address information to be used by the optical scanner to assist in reading and decoding the printed code;

a two-dimensional encoded information portion wherein user information is encoded in bit areas which may be printed or blank, and wherein error correction information is appended to said user information, said bit areas forming a row-column arrangement having a plurality of transverse data rows, said user information being encoded in said information portion sequentially from a beginning of said encoded information portion, sequentially along each data row, then sequentially to the next data row until a last data row is reached, said user information being followed by said error correction information;

said error correction being calculated by selecting subunits of user information to be encoded in said information portion to form error correction packets of said subunits, each of the subunits of information in each error correction packet being constituted of bits encoded in bit areas in the encoded information portion which are displaced row-wise and column-wise from bit areas in which are encoded the bits constituting the other subunits in the error correction packet, and applying an error correction algorithm on each of said error correction packets separately to calculate error correction bits to include in said error correction information to correct said user information in the case of error.

6. The two-dimensional, high-density, damage-tolerant printed code of claim 5, wherein:

said subunits of information to be error corrected are selected by dividing the sequentially-encoded user information into a number of packets; selecting a portion of each packet; combining the information from each packet; and applying the error correction algorithm to the information selected from each of said packets; and appending the error correction information to said data message; continuing the error correction process by selecting new information from each of said packets; applying the error correction algorithm to this information; appending the error-correction information to the encoded information portion; and continuing the process until all of the information in each of said packets has been selected, combined and error corrected.

7. The two-dimensional, high-density, damage-tolerant printed code of claim 6, wherein:

said error correction algorithm is the Reed-Solomon method.

8. The two-dimensional, high-density, damage-tolerant printed code of claim 6, wherein:

said error-correction information appended to said information portion is calculated using a convolutional code.

9. A system for providing positive off-line identity verification comprising the following elements:

an identity document;

said identity document bearing a two-dimensional, high-density, damage tolerant printed code encoding multiple biometric information and text, said code comprising:

a decode information portion encoding information to be used by the optical scanner to assist in reading and decoding the printed code;

a demarcation portion to demarcate a lateral extent of the printed code from an adjoining portion of the substrate;

row address portions encoding row address information to be used by the optical scanner to assist in reading and decoding the printed code; and a two-dimensional encoded information portion wherein biometric/text information and error-correction information is encoded in bit areas in a row-column arrangement, where bit areas may be printed or blank to encode such information, said error correction information comprising a plurality of error correction bit groups, each error correction bit group being calculated from a corresponding one of a plurality of error correction packets of subunits of biometric/text information encoded in said encoded information portion, each subunit of information in each error correction packet being constituted of bits in the encoded information portion which are displaced row-wise and column-wise from bit areas in which are encoded the bits constituting the other subunits in the error correction packet; and an off-line, integrated positive identity verification apparatus, said apparatus comprising:

a scanner for reading the two-dimensional, high-density, damage-tolerant printed code contained in the identity document;

memory means for storing the multiple biometric information and text recovered from the printed code;

real-time biometric capture means for capturing biometric information from a person whose identity is to be verified;

processor means for comparing biometrics recovered from the two-dimensional, high-density, damage-tolerant printed code with real-time biometric information captured by said real-time biometric capture means to determine whether the real-time biometric information matches the biometric information recovered from the two-dimensional, high-density, damage-tolerant printed code; and identity verification outcome notification means for indicating whether the real-time biometric information captured from the person whose identity is to be verified matches the biometric information recovered from the two-dimensional, high-density, damage-tolerant printed code.

\* \* \* \* \*